ured bases.

UNITED STATES PATENT OFFICE.

GUSTAV SCHULTZ, OF BERLIN, GERMANY.

PRODUCTION OF ORANGE AND RED DYE-STUFFS.

SPECIFICATION forming part of Letters Patent No. 418,657, dated December 31, 1889.

Application filed February 5, 1889. Serial No. 298,749. (No specimens.)

*To all whom it may concern:*

Be it known that I, GUSTAV SCHULTZ, of Berlin, in the Kingdom of Prussia, German Empire, have invented new and useful Improvements in the Production of New Orange and Yellow Dye-Stuffs; and I do hereby declare that the following is a full, clear, and exact description of the invention, which will enable others skilled in the art to which it appertains to make and use the same.

By heating two molecules each of paratoluidine, xylidine, or cumidine with two molecules of sulphur sulphureted bases are formed under escaping of sulphureted hydrogen, which bases may be called diamido-stilbene sulphide, diamidodimethyl-stilbene sulphide, and diamidotetramethyl-stilbene sulphide. By the action of nitrous acid upon these bases they are converted into diazo compounds, which can be combined to dye-stuffs with phenol and its homologues, resorcin, resorcin ethers, orcin, naphthol, dioxynaphthaline, phenyl-diamine, toluylendiamine, chrysoidines, naphthylamine, and its alkyl derivates, or with their sulphonic or carbonic acids.

I. *Production of the sulphureted bases.*—The following description of the production of diamidodimethyl-stilbene sulphide may serve as an example for the production of the sulphureted bases. This base is obtained by heating twenty kilograms of monoxylidine with ten kilograms of sulphur so long as sulphureted hydrogen is escaping. After allowing the product of this reaction to cool down a little it is entered into sulphuric acid previously diluted with an equal quantity of water. The solution of the new base which is thus obtained is then poured into water, whereby the diamidodimethyl-stilbene sulphide separates in yellow flakes, while some unconverted xylidine remains in solution as sulphate. The new base is isolated by filtration of the precipitate. By using raw technical xylidine instead of pure amidomonoxylol, which latter forms the principal part of the former, diamidodimethyl-stilbene sulphide is likewise obtained. The new base forms an amorphous yellow compound which is not soluble in water, but soluble in alcohol, and which melts at 170° to 180° centigrade.

By using in the above-described process paratoluidine instead of monoxylidine, diamido-stilbene sulphide is obtained, whereas diamidotetramethyl-stilbene sulphite is obtained by using cumidine.

II. *Production of dye-stuffs from the sulphureted bases.*—For producing dye-stuffs from the sulphureted bases these latter are first converted into their diazo combinations in a strongly-acidulated solution by means of nitrous acid, and these combinations are then combined with the above-named substances.

*Example: Dye-stuffs from diamido-stilbene sulphide and alpha-naphthol disulphonic acid.*—Twenty kilograms of diamido-stilbene sulphide are suspended in a solution of sixty kilograms of hydrochloric acid in one thousand liters of water, and a solution of fourteen kilograms of nitrite of soda in fifty liters of water is gradually entered into it. The diazo combination thus obtained is then poured into an alkaline solution of alpha-naphthol disulphonic acid, whereby the azo dye-stuff is formed. This latter is obtained by boiling the solution, precipitating with salt, and filtering the precipitate. The azo dye-stuff which is obtained by this process dyes cotton direct from a soap bath in a red shade. The color stands very well the influence of acids, soap, and light.

If in the above-described example alpha-naphthylamine sulphonic acid of Piria is used instead of alpha-naphthol disulphonic acid, a dye-stuff is obtained which dyes cotton an orange shade. By combining the beta-naphtholsulphonic acid of Bayer and the beta-naphthol disulphonic acid G with the above diazo combination a red dye-stuff is obtained, whereas beta-naphthol disulphonic acid R forms a bluish-red dye. Phenol and phenolsulphonic acids yield yellow dye-stuffs, and resorcin yields orange dyeing ones.

If diamidodimethyl-stilbene sulphide or diamidotetramethyl-stilbene sulphide are used instead of diamido-stilbene sulphide, and if they are diazotized and the diazo combinations thus obtained again combined with the above-described combinations, dye-stuffs are obtained which also dye cotton direct in shades very similar to those of the dye-stuffs derived from diamido-stilbene sulphide.

Some of the combinations thus obtained are very difficultly soluble, and consequently not well adapted for dyeing purposes. It is in such cases preferable to convert the bases which are in the above description named diamidodimethyl-stilbene sulphide and diamidotetramethyl-stilbene sulphide into their sulphonic acids by means of sulphuric acid. These sulphonic acids are then converted into diazo combinations by means of nitrous acid, and afterward combined with the above-mentioned phenols, bases, or their sulphonic or carbonic acids. For instance, the sulphonic acid of diamidodimethyl-stilbene sulphide yields according to the above-described process, in combination with Bismarck brown, a brown dye-stuff which dyes cotton direct a brown shade.

I claim—

1. The process for the production of dye-stuffs which consists in forming a sulphide of an amido compound, such as xylidine or cumidine, diazotizing the sulphide, and adding a phenol, naphthol, resorcin, orcin, amido compound, or naphthylamine, or their sulphonic or carbonic acids, substantially as described.

2. The process of producing dye-stuffs which consists in heating up certain amido compounds, such as cumidine or xylidine, with sulphur, treating the sulphide as formed with sulphuric acid, converting this sulphonic so formed into the corresponding diazo compound, and combining that compound with a phenol, naphthol, orcin, resorcin, amido compound, or naphthylamine, or their carbonic or sulphonic acids, substantially as described.

In testimony whereof I hereunto set my hand and affix my seal in the presence of two witnesses.

GUSTAV SCHULTZ. [L. S.]

Witnesses:
M. MOELLER,
R. KIRCHOFF.